May 19, 1936.  H. T. KRAFT  2,041,357
METHOD OF MAKING NONMETALLIC CONTAINERS
Filed Nov. 19, 1934   7 Sheets-Sheet 1
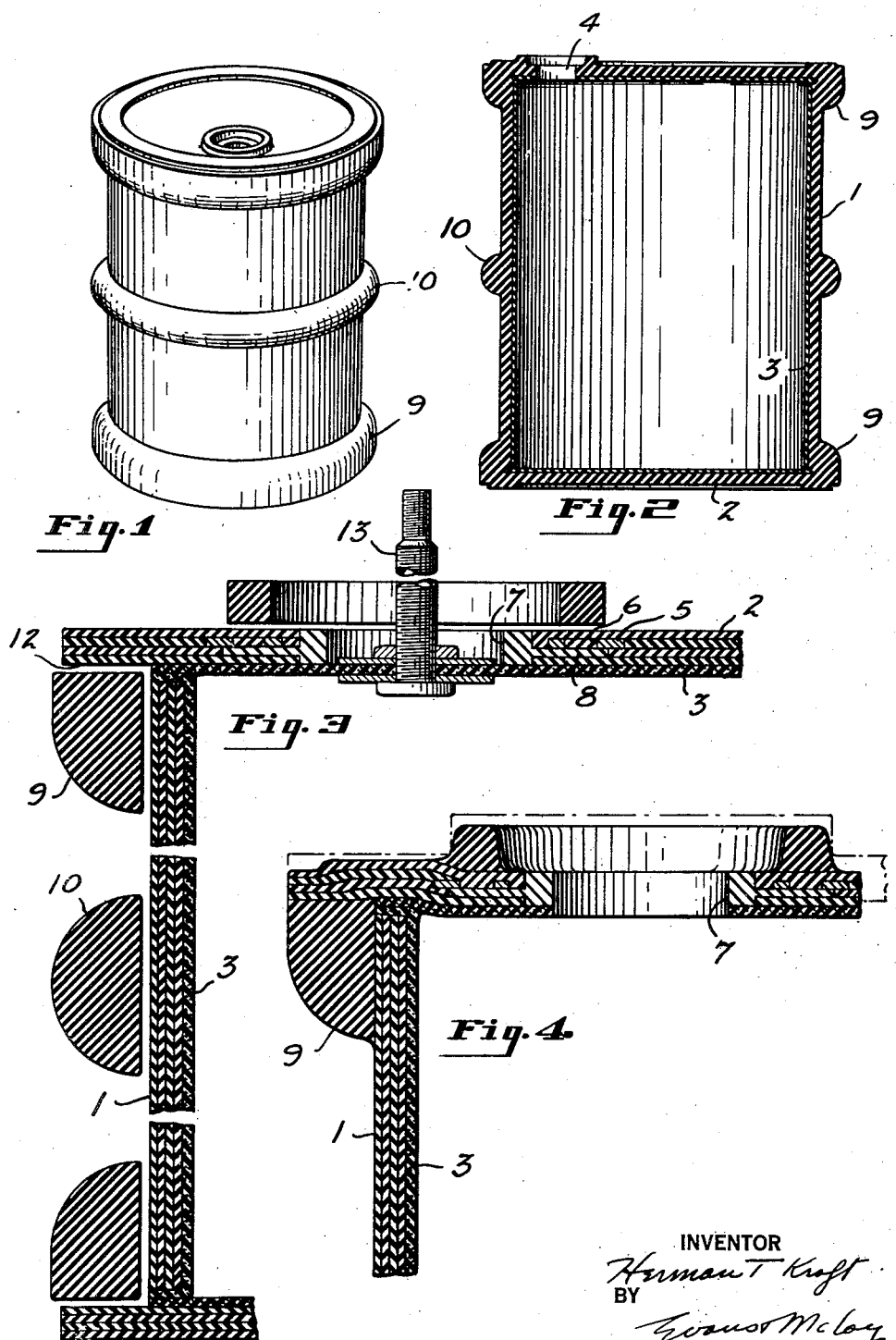

May 19, 1936.  H. T. KRAFT  2,041,357
METHOD OF MAKING NONMETALLIC CONTAINERS
Filed Nov. 19, 1934   7 Sheets-Sheet 4
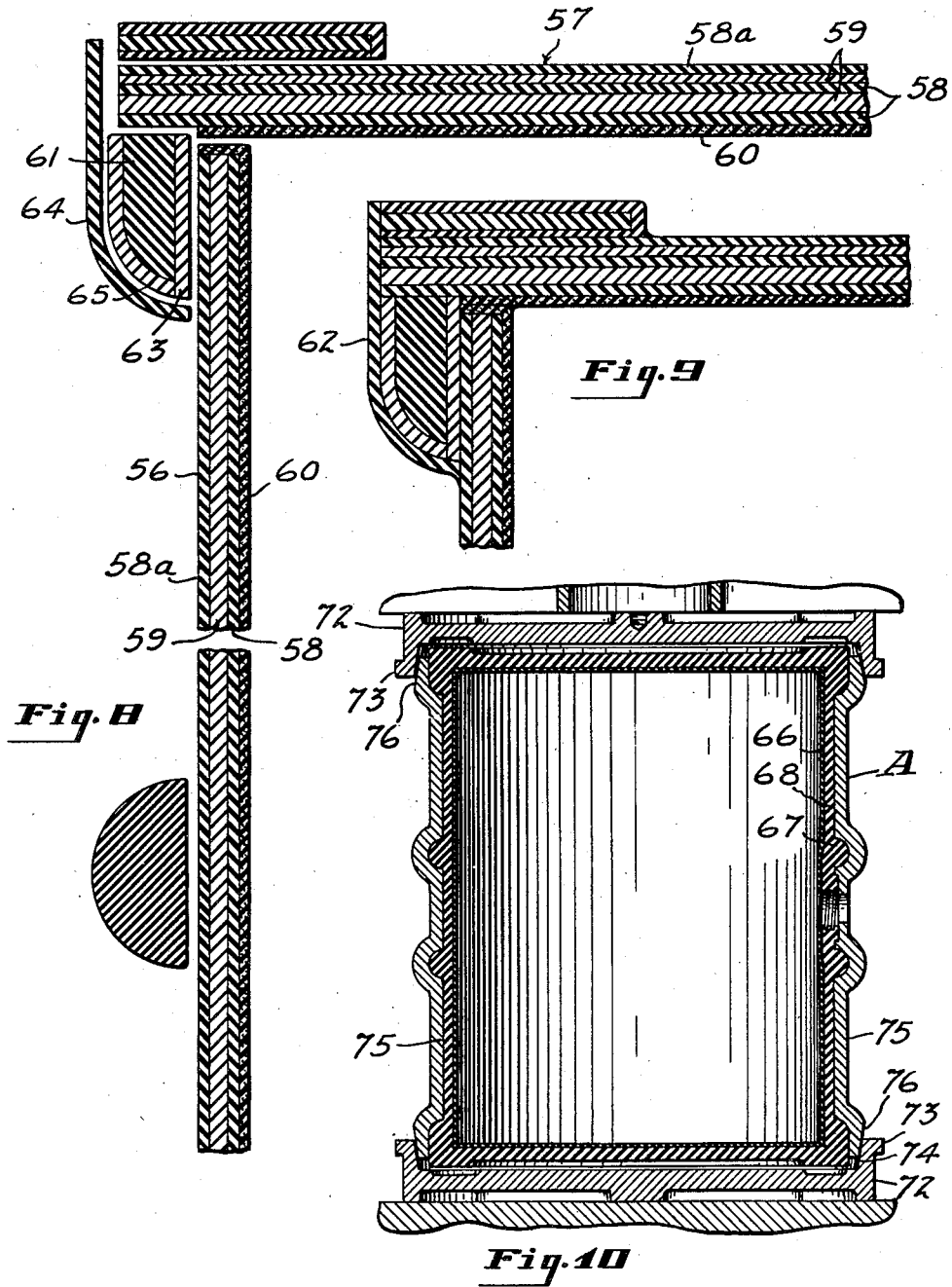

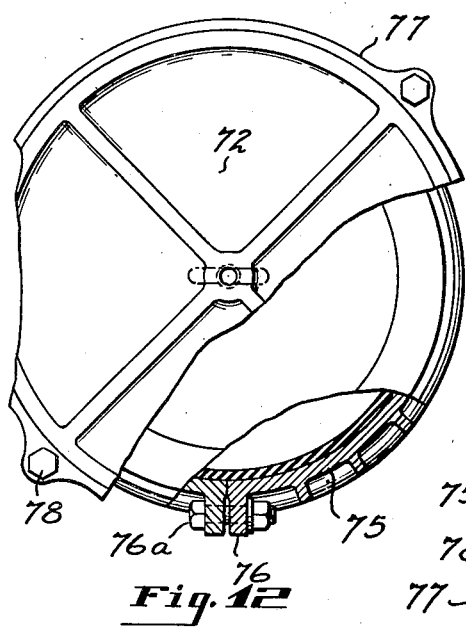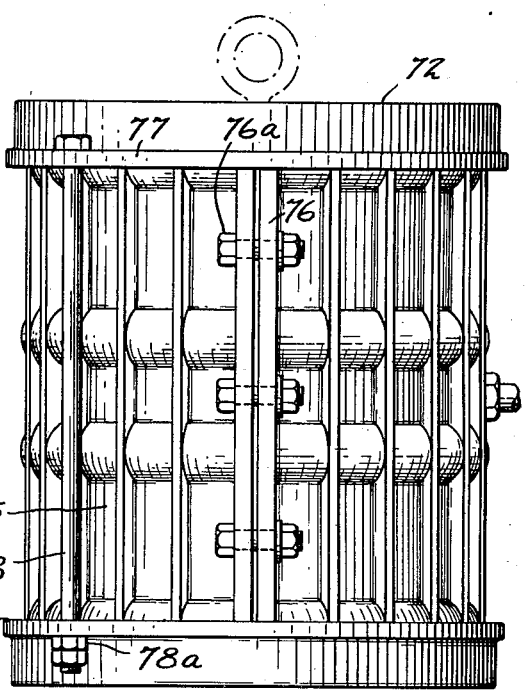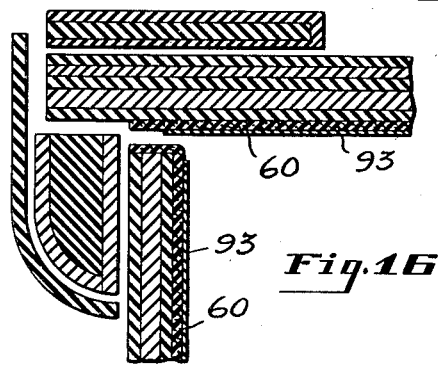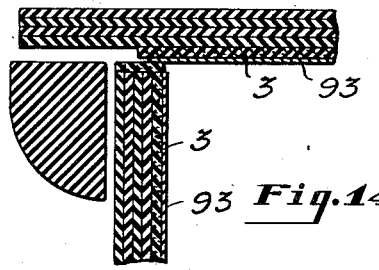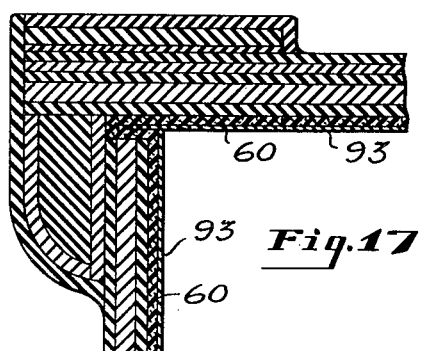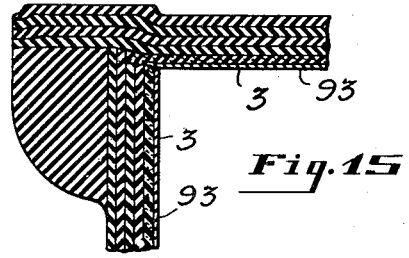

May 19, 1936. H. T. KRAFT 2,041,357
METHOD OF MAKING NONMETALLIC CONTAINERS
Filed Nov. 19, 1934 7 Sheets-Sheet 7
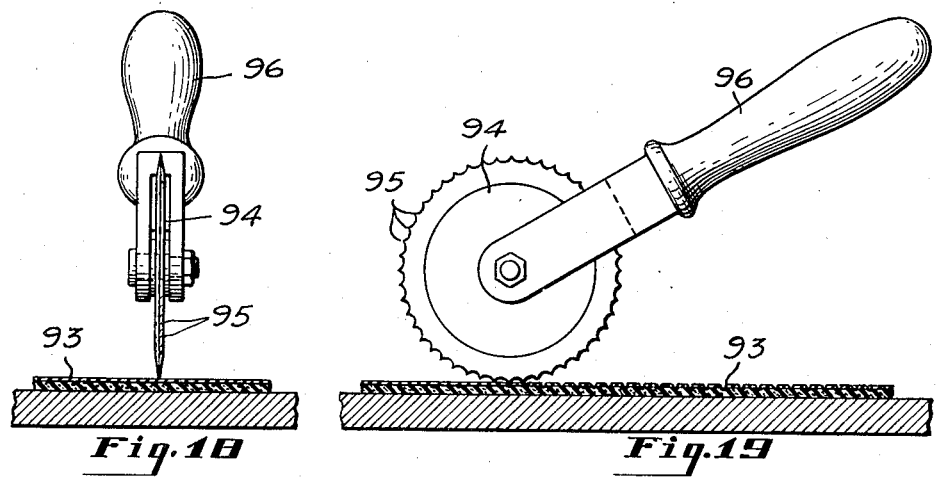
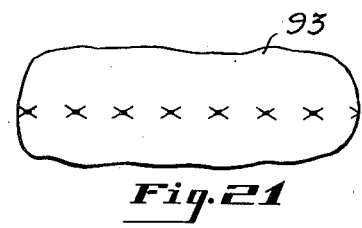
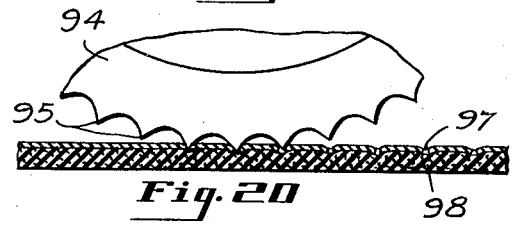
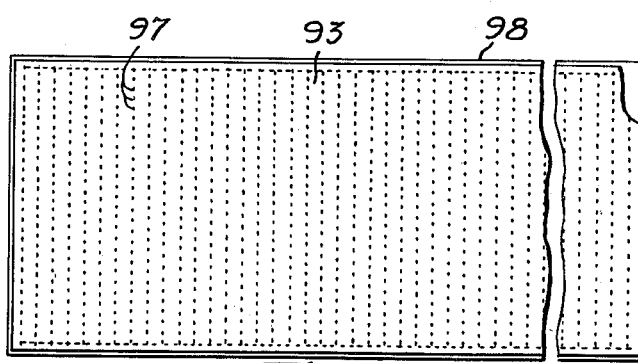
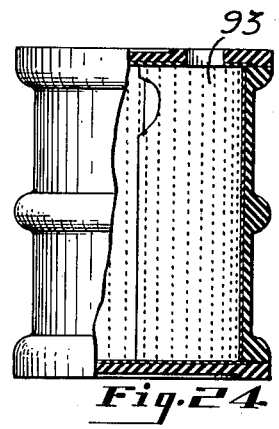
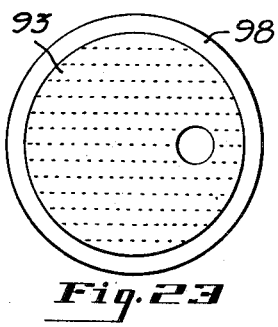
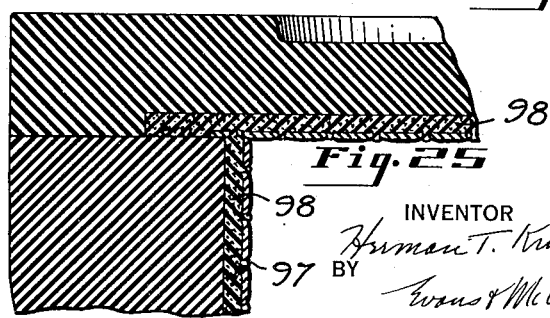
INVENTOR
Herman T. Kraft
BY
Evans & McCoy
ATTORNEYS Patented May 19, 1936

2,041,357

UNITED STATES PATENT OFFICE 2,041,357

METHOD OF MAKING NONMETALLIC CONTAINERS

Herman T. Kraft, Akron, Ohio, assignor to The General Tire & Rubber Company, Akron, Ohio, a corporation of Ohio Application November 19, 1934, Serial No. 753,721

13 Claims. (Cl. 18—56)

This invention relates to the method of producing non-metallic acid containers of the general character shown and described in my co-pending applications, Serial No. 705,525 filed January 5, 1934, and Serial No. 753,719 filed November 19, 1934.

The principal object of the present invention is to provide a new and improved method of forming non-metallic acid drums or containers by means of which a superior product may be efficiently produced.

Another object is to provide a method of producing non-metallic acid-containers of vulcanizable material by means of which the containers are axially compressed prior to vulcanization.

Another object is to provide a method of producing acid containers of vulcanizable material, by means of which the container is axially compressed prior to vulcanization and during vulcanization is subjected to an internal pressure created by a gas or liquid.

A further object is to provide an improved method of lining an acid container of vulcanizable material with an acid-resistant material such as "ebonite".

Other objects will be apparent from the following description of the accompanying drawings in which, Figure 1 is a perspective view of an acid container of the character manufactured in accordance with the present invention;

Fig. 2 is a longitudinal section of the container shown in Fig. 1;

Fig. 3 is an enlarged fragmentary section of portions of the ends and body of the container showing the general arrangement of the layers of material prior to vulcanization and prior to the time they are subjected to axial pressure.

Fig. 4 is a fragmentary view showing the assembled relation of the layers of material after vulcanization;

Fig. 8 is a section similar to Fig. 3, showing the container material as comprised of layers of rubberized fabric and relatively hard, rubber fibre material;

Fig. 9 is a section similar to Fig. 4 of the modified container;

Fig. 10 is a vertical section through one mold that may be used in producing the container shown in Figs. 8 and 9, the heater being illustrated in the process of being assembled;

Fig. 12 is a fragmentary plan view of the mold shown in Figs. 10 and 11;

Fig. 13 is a side elevation of the mold shown in Figs. 10, 11 and 12;

Figure 5:
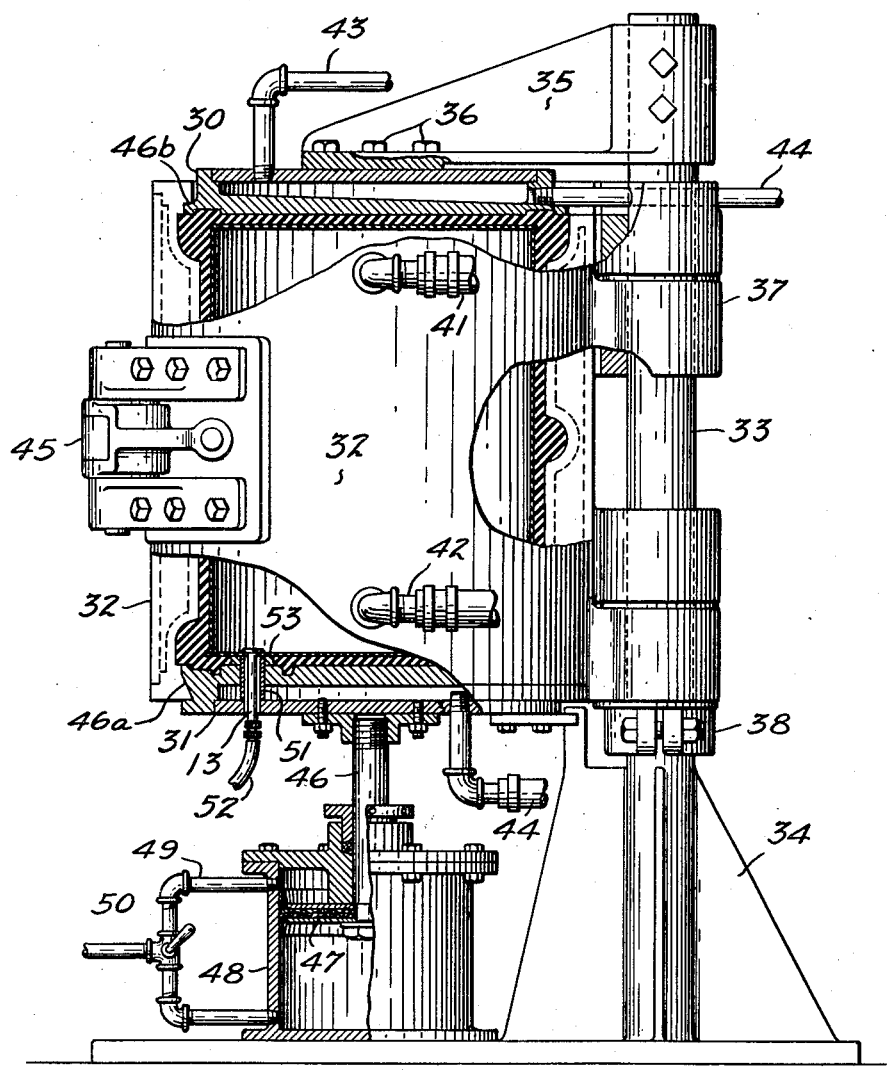
Fig. 5 is a side elevation of one form of vulcanizing heater that may be used in practicing the present invention, portions of the heater being shown in section.

Figs. 14 and 15 are views similar to Figs. 3 and 4 showing the use of an ebonite or similar lining for the containers shown in Figs. 3 and 4;

Figs. 16 and 17 are views similar to Figs. 8 and 9 showing the use of an ebonite or similar lining for the container of Figs. 8 and 9;

Fig. 18 is a front view of a means for applying ebonite or similar hard rubber material to the container material;

Fig. 19 is a side elevation of the apparatus shown in Fig. 18;

Fig. 20 is an enlarged fragmentary sectional view showing the apparatus in the process of stitching ebonite to the container material;

Fig. 21 is a fragmentary view showing the stitching perforations in the ebonite lining;

Fig. 22 is a plan view of the body of the container in extended form and showing the stitching of the ebonite lining;

Fig. 23 is a plan view of one of the container heads showing the stitching of the ebonite lining;

Fig. 24 is a side elevation of a container, a portion of the same being shown in section to show the ebonite lining; and Fig. 25 is an enlarged section through one of the corners of the container shown in Fig. 24, showing the ebonite lining.

Referring to the drawings in which like numerals refer to like parts throughout the several views, the drum or container comprises a cylindrical wall or body 1 and ends or heads 2 molded together to form an integral unit. The body 1 and heads 2 are composed of non-metallic fibrous material, as will be more fully described in detail.

The inside of the drum is faced with an acid resistant lining 3 which covers and is bonded to the inner surface of the body 1 and the heads 2.

Figure 11:
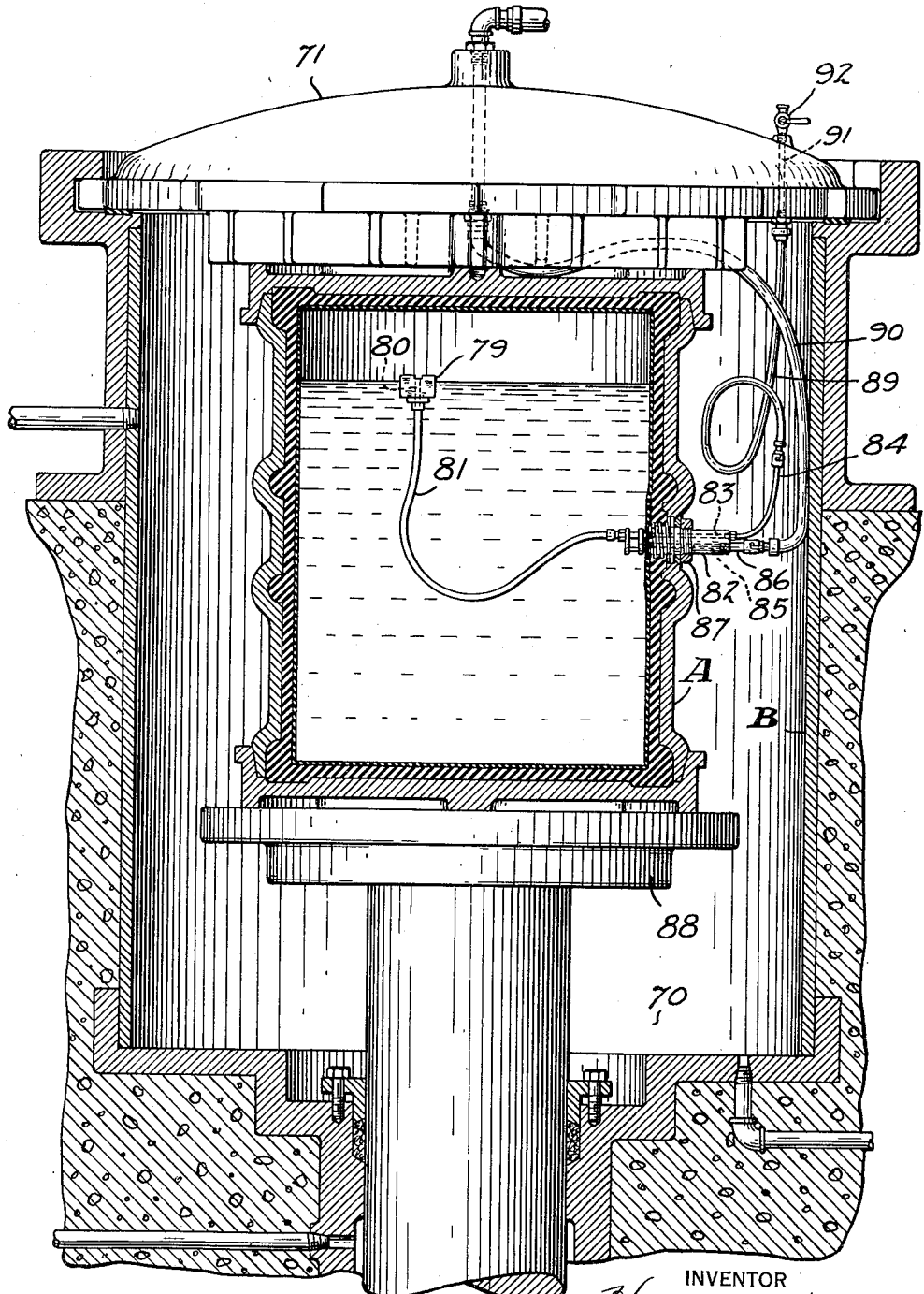
Fig. 11 is a sectional view showing the mold positioned in a pot heater and showing the means for exhausting air from the container.

One of the container heads 2 is provided with a bung opening 4 at any suitable location and the portion of the head surrounding the opening 4 is preferably strengthened and reinforced by an annular metallic member 5 embedded in the end material and having apertures 6 therein through which the material comprising the head may extend. The opening 4, however, may be formed in the body 1 as shown in Fig. 11.

Positioned within the opening 4 is an annular ring 7 preferably of hard rubber, which is provided with a peripheral flange 8 also disposed between layers of the material comprising the container.

In order to provide an efficient means of handling the container and also to strengthen the same, integral chimes 9 are provided to extend circumferentially around the container adjacent its ends. Also, if desired, and particularly in the larger sized containers, one or more additional chimes 10 may be provided around the central portion of the container intermediate the ends.

Although any suitable fibrous or other nonmetallic material may be employed for the body 1 and the heads 2, I prefer to use rubberized fibres such as the clippings and cuttings from rubberized fabric stock used in the manufacture of pneumatic tires. These clippings and cuttings are preferably ground into fine particles and then run through a calender mill to produce sheets of rubberized fibres. The mill, during the sheet forming operation, tends to form a grain in the sheets ultimately produced.

In order that the body and heads of the container will be non-rupturable and hook-proof, and capable of withstanding relatively high pressures, a plurality of such sheets of rubberized fibres are employed with the grain of one sheet disposed at an angle to the grain of adjacent sheets.

In forming the container shown in Figs. 1 to 4, the superposed sheets of the rubberized material are preferably run through a pair of rolls to bring them into intimate contact with each other and are then shaped to form the body 1 and the heads 2. Sheets 3 of pure gum rubber are then applied to those faces of the sheets which form the interior of the container and are preferably stitched thereto. As indicated in Fig. 3, the sheets 3 of the gum rubber are of slightly less area than the drum heads to which they are applied, and the sheets applied to the body of the container are extended over the end faces of the body.

Preformed sections of rubber material are disposed about the cylindrical wall adjacent the ends which during the subsequent molding operation join with the extending portions 12 of the head sheets and form the chimes 9 of the container.

During the assembly of the individual sheets which comprise the one container head, the annular ring 5 is disposed between the sheets to surround the opening 4, and the flange 8 of the annular ring 7 is also disposed between the sheet material as indicated in Fig. 3. The sheet material is first assembled in the manner illustrated in Fig. 3 with the cylindrical body 1 disposed on the lower head 2 and with the upper head 2 disposed on the upper surface of the body 1, the gum rubber sheets of the heads 2 extending slightly beyond the interior surface of the cylindrical body 1 and the gum rubber sheet of the cylindrical body being of such extent that it is positioned between the end faces of the cylindrical body and the gum rubber sheets of the container heads.

The sheet material while in this assembled relation is then disposed in a suitable mold cavity for the molding operation. The length of the molding cavity is slightly less than the over-all length of the container so that when the mold is closed the sheet material will be compressed axially of the container, the dotted line in Fig. 4 representing the initial positions of the sheet material, i. e., the position of the same prior to the closing of the mold. In this manner, sufficient longitudinal pressure is exerted to axially compress the body and to bring the end walls 2 into intimate sealed contact with the end faces of the cylindrical body.

It will be noted in Fig. 3 that the gum rubber sheet 3 for the upper container head extends across the bung opening 4. A suitable air valve 13 is mounted in the portion of the gum rubber sheet 3 which spans the opening 4 so that the interior container assembled in the foregoing manner may be subjected to internal pressure during the molding operation. The molding operation, of course, is carried on while the material is subjected to heat and pressure in such a manner that the end walls are securely and intimately bonded to the cylindrical body 1 and also in such a manner that the gum rubber lining is intimately bonded to the interior faces of the container.

After the molding operation is completed and the container cured, the portion of gum rubber containing the air valve 13 and which spans the aperture 4 is cut away.

The molding operation thus provides a container of one-piece construction having a complete internal facing of gum rubber.

I have illustrated in Figs. 5 to 8 one form of apparatus which may be utilized in practicing the present invention which corresponds substantially to the apparatus disclosed and claimed in my copending application Serial No. 718,974 filed April 4, 1934 upon which Patent No. 1,990,455 was granted February 5, 1935. This apparatus which is in the form of a vulcanizing heater comprises an upper stationary heater part 30, a lower axially movable heater part 31, and a pair of hinged semi-circular heater parts or wings 32, which are arranged to be clamped together to completely surround the container to be vulcanized.

Figure 6:
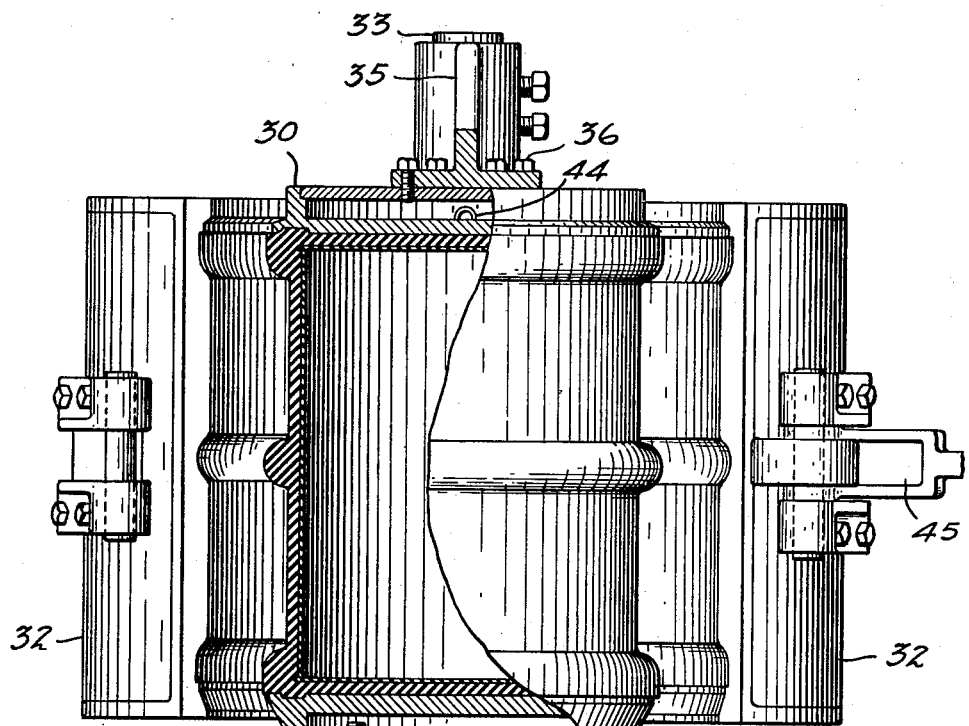
Fig. 6 is a fragmentary view of the heater showing the same in open position.

As indicated in Fig. 6 the container is vulcanized in an upright position with the head in which the bung opening 4 is formed in the lowermost position. The upper part or section 30 and the wings 32 are supported by a vertical column 33 which is supported in an upright position by a suitable base 34, the column 33 having a suitable overhanging bracket 35 to which the upper section 30 is rigidly secured by bolts 36. The wings 32 are provided with hinged arms 37 journalled on the column 33, the column having a clamp 38 for supporting the hinged arms 39.

The upper and lower heater parts or sections 30 and 31, respectively, are hollow and provided with inlet and outlet conduits 43 and 44, respectively, for the circulation of a heating medium. The semi-circular wing sections 32 are also hollow and provided with fluid inlet and outlet conduits 41 and 42, respectively. A toggle mechanism 45 of any suitable construction is provided for locking the wing sections together.

A firm engagement between the hinged sections 32 and upper section 30 is provided by means of inclined wedging surfaces 46b formed at the outer peripheral edge of the section 30 and at the inner peripheral edges of sections 32 as shown in Fig. 6.

Engagement between the lower section 31 and hinged sections 32 is provided by sharply inclined surfaces 46a which extend peripherally about the section 31 and the lower edges of the wing sections 32.

The lower section 31 is vertically movable and is mounted on a plunger rod 46 having a plunger 47 at its lower end which is reciprocated by fluid pressure within a suitable pressure cylinder 48 mounted on the base 34. A suitable medium under pressure is admitted into the cylinder 48 at opposite sides of the plunger 47 through conduits 49 controlled by a valve 50.

The lower section 31 is also provided with an annular member 51 extending therethrough which allows the valve 13 to extend through the section so that a filler hose 52 may be connected to the same. A suitable collar 53 is also provided to fit within the opening of the ring 7 as shown in Fig. 6.

Figure 7:
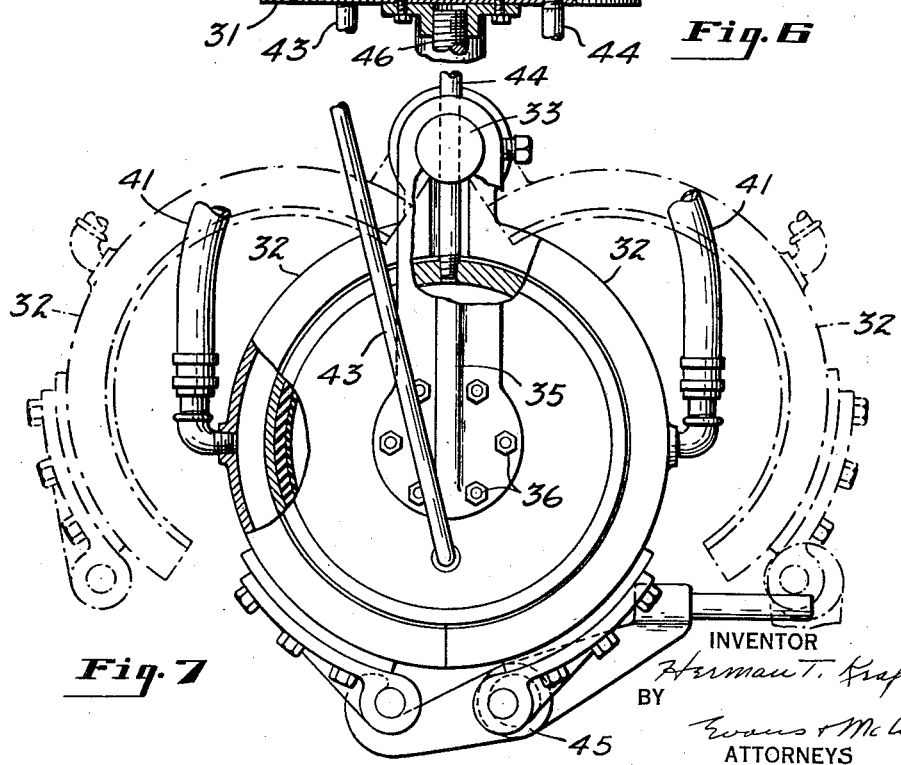
Fig. 7 is a plan view of the heater.

In the operation of the vulcanizing heater, the hinged sections 32 are swung to the open positions shown in dotted outline in Fig. 7 and the lower section 31 dropped to its lowest position. The container to be vulcanized is then properly positioned on the lower section. The container, however, at this time is composed of the separate body 1, the heads 2 and the chimes 9, as shown in Fig. 3.

The lower section is then raised to bring the upper head as seen in Fig. 7 into engagement with the upper section 30. It will be noted from Fig. 7 that at the time of this engagement the lower mold section 32 is not in its uppermost position, and the container is of slightly greater length than the vulcanized container shown in the mold in Fig. 6. The lower section 31 is allowed to travel to its uppermost position and this causes the body of the container to be axially compressed, causing a firm engagement between the rubber lined heads and body of the container. The hinged sections 32 are then swung toward each other and the toggle mechanism 45 to bring the sections 32 into firm abutting engagement. This causes the hinged sections to slightly circumferentially compress the container body and also provides a firm wedging engagement between the inclined surfaces 46 and between the inclined surfaces 45, thus confining the container within a completely sealed vulcanizing chamber.

After the toggle mechanism is locked, the hose or conduit 50 is attached to the filler valve 13 and the container is then preferably filled with $CO_2$ gas to a suitable vulcanizing pressure. The heating medium is then permitted to pass into the heating chambers of the heater sections.

After the vulcanizing operation is completed, the toggle mechanism is unlocked and fluid under pressure admitted to the upper side of the plunger 47 which causes the lower heater section to travel downwardly. This downward travel, by reason of the inclined surfaces 46a and 46b, swings the hinged sections 12 outwardly, breaking them away from the vulcanized container.

In Figs. 8 and 9 I have shown a slightly different container in which the head portions 57 are each comprised of alternating layers 58 and 59 of vulcanizable material. The layers 58 of which two are shown, although a greater number may be employed if desired, are preferably of the same rubberized fibrous material used in the container described in connection with and shown in Figs. 3 and 4. The alternating layers 59 are preferably of a material known as "nail stock" which is a relatively hard rubber fibrous material. The lining 60 is shown in Figs. 8 and 9 and is preferably of pure gum rubber. The body portion 56 is also comprised of layers 58 and 59 of the fibrous material and nail stock respectively, and with a gum rubber lining 60. The bead and body portions may also be provided with an outer layer 38a of softer rubber, such as tread stock. In this container construction the base portion 61 of the chime 62 is covered with material 65 of the same character as used in the layers 58 and a strip 63 of similar material is disposed between the base portion 61 and body of the container. A band 64 of rubber is also disposed to cover the material 65 and the peripheral surfaces of the container heads 57.

In Figs. 10 to 13 I have shown another form of apparatus which may be utilized in practicing the present invention with either of the containers described, this apparatus corresponding substantially to the apparatus disclosed and claimed in my copending application Serial No. 753,720 filed November 19, 1934. The container 66 as shown in these views, is of the type having two intermediate chimes 67 and a bung opening in the body portion 68 between the chimes 67. This apparatus includes a mold A which, after it is assembled, is placed in a pot heater B having a heating chamber 70 that is closed by a cover 71. The mold A comprises a pair of mold end parts 72 each having a peripheral flange 73, the inner circumferential face 74 of which is tapered outwardly from the body portion of the mold part, and a pair of semi-circular mold body parts 75. The body parts 75 have their ends tapered at 76 to correspond with the taper of the flange faces 74 as shown in Fig. 10. The body parts 75 are formed with oppositely disposed longitudinally extending flanges 76 through which bolts 76a are extended to clamp the body parts together. The end parts 72 are provided with circumferential flanges 77 and bolts 78 are provided at opposite sides of the mold to extend through the flanges 77 to draw the end parts 72 into engagement with the body parts 75.

I have also provided a novel means for exhausting air from and introducing liquid into the container to be vulcanized. This means comprises a float 79 having a passage 80 therethrough which is in communication with a flexible conduit 81 attached to a member 82 and in communication with an outlet passage 83 in the member 82. The outer end of the passage 82 carries a suitable hose connection 84. The member 82 also has an inlet passage 85, the outer end of which carries a hose connection 86. In utilizing this apparatus the float 79 is inserted into the container to be vulcanized through the filler aperture and the member 82 preferably threaded into the filler aperture as shown in Fig. 11.

The two mold body parts 75 are then placed around the body 68 of the container and clamped together by the bolts 76a which circumferentially compresses the container. The member 82 extends through an opening in one of the body parts and is clamped by means of a nut 87 threaded thereon.

One of the container heads is then placed within the bottom mold end part and the clamped container is then placed over this head after which the other container head is placed in position and the other mold end part assembled, as indicated in Fig. 10. Since the assembled container is of greater length than the distance between the ends of the vulcanizing chamber of the assembled mold, the container will project beyond the mold body parts as shown in Fig. 10.

The bolts 78 are then inserted through the flanges 77 and the nuts 78a threaded onto the bolts which draws the mold end parts inwardly towards each other into contact with the ends of the body parts during which time the container is axially compressed.

The mold with the container therein is next placed within the heating chamber 70 of the pot heater B and positioned on a plunger 88 which is provided within the chamber 70. Then the connection 86 is attached to a conduit 90 which extends through the cover 71 of the pot heater, this conduit being in communication with a source of liquid under pressure. Also, the connection 84 is attached to a conduit 89 which communicates with an outlet passage 91 in the cover 71, the passage 91 being closable by a suitable valve 92. The cover 71 is then locked in place after which the plunger 88 is moved upwardly to securely clamp the mold in position. The valve 92 is opened and liquid is then introduced through the conduit 90 and the inlet passage 85 into the interior of the container. As the liquid rises in the container the float is carried upwardly, allowing the air above the liquid to exhaust through the passage 80, conduit 81 and conduit 89. As soon as the air is completely exhausted and the container filled with liquid the valve 92 is closed and the liquid is then placed under pressure.

The heating medium is then introduced into the heating chamber 70 to carry on the vulcanizing operation.

It has been found in some instances that "ebonite" or material of similar composition is more resistant to certain acids than gum rubber, and in Figs. 14 and 15 I have shown an ebonite lining 93 applied to the gum rubber linings 3 of a container similar to the one shown in Figs. 3 and 4. I have also shown in Figs. 16 and 17 a similar lining 93 of ebonite or other similar material applied to the gum rubber of the linings 60 of a container similar to the container shown in Figs. 8 and 9.

Since the ebonite lining 93 cannot be axially compressed during the axial operation of the container body, the lining 93 is made of less length than the gum rubber lining, as indicated in Figs. 14 and 16, so that after the axial compression of the container body the lining 93 for the body of the container will be engaged with the lining 93 of the head portions of the container.

In Figs. 18 to 25 I have shown apparatus for mounting the lining 93 of ebonite or similar material to the gum rubber. The lining 93, which is pliable, is applied by the use of a stitching wheel 94 having a series of sharp teeth 95 on its peripheral surface. The wheel 94 may be provided with a handle portion 96 and may be operated by hand.

The lining 93 is stitched at spaced intervals in parallel directions, as indicated in Figs. 22, 23, and 24, and during the stitching operation the teeth or projections 95 of the wheel 94 form a series of perforations 97 in the lining which causes the lining to rupture at each point of contact of the wheel therewith, and provide a group of small triangularly shaped portions 98 which are extended, during the rupturing operation, into the gum rubber as indicated at Fig. 20. These small portions tend to assume their normal positions due to the pliability of the ebonite, and in so doing grip portions of the gum rubber lining therebetween. During the vulcanization of the container having such a lining of ebonite or similar material, the gum rubber also has the tendency to further flow or extend through the perforations 97 and become vulcanized to the walls of the perforations so that the ebonite lining will be firmly held in position.

By axially compressing the container within the vulcanizing chambers and subjecting the same to internal pressure, a single piece, nonmetallic container suitable for the transportation of acids, of superior quality can be produced.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The method of forming one-piece containers having end and annular body portions of vulcanizable material, which comprises supporting the body portion between said end portions, confining the outer faces of said end portions and compressing said end and body portions axially with sufficient pressure to shorten said body portion, circumferentially confining said portions, subjecting the confined container to internal pressure, and vulcanizing said container while so confined and under such pressure to integrally unite said end portions with said body portion.

2. The method of forming one-piece containers having end and annular body portions of vulcanizable material, which comprises supporting the body portion between said end portions, confining the outer faces of said end portions and compressing said end and body portions axially with sufficient pressure to shorten said body portion, circumferentially confining said portions, subjecting the internal walls of the container to $CO_2$ gas under pressure, and vulcanizing said container while so confined and under such pressure to integrally unite said end portions with said body portion.

3. The method of forming one-piece containers having end an annular body portions of vulcanizable material, which comprises supporting the body portion between said end portions, confining the outer faces of said end portions and compressing said end and body portions axially with sufficient pressure to shorten said body portion, circumferentially confining said portions, introducing a liquid under pressure into the confined container, and vulcanizing said container while so confined and under such pressure to integrally unite said end portions with said body portion.

4. The method of forming one-piece containers having end and annular body portions of vulcanizable material, which comprises supporting the body portion between said end portions, confining the outer faces of said end portions and compressing said end and body portions axially with sufficient pressure to shorten said body portion, circumferentially confining said portions, introducing hot water under pressure into the confined container, and vulcanizing said container while so confined and under such pressure to integrally unite said end portions with said body portion.

5. The method of forming one-piece containers having end and annular body portions of vulcanizable material, each having a facing of rubber, which comprises supporting the body portion between said end portions with the facings of the body portion engaged with the facings of the end portions and with the edges of all said facings disposed between said end portions and ends of said body portion, confining the outer faces of said end portions and compressing said end and body portions axially with sufficient pressure to substantially shorten said body portion, circumferentially confining said portions, subjecting the confined portions to internal pressure, and vulcanizing said portions to integrally unite said body portion with said end portions and form a rubber lined one-piece container.

6. The method of forming one-piece containers having end and annular body portions of vulcanizable material, each having a facing of gum rubber, which comprises supporting the body portion between said end portions with the facings of the body portion engaged with the facings of the end portions and with the edges of all said facings disposed between said end portions and ends of said body portion, confining the outer faces of said end portions and compressing said end and body portions axially with sufficient pressure to substantially shorten said body portion, circumferentially confining said portions, subjecting the confined portions to internal pressure, and vulcanizing said portions to integrally unite said body portion with said end portions and form a rubber lined one-piece container.

7. The method of forming one-piece containers having end and annular body portions of vulcanizable material, each having a facing of hard rubber, which comprises supporting the body portion between said end portions with the facings of the body portion engaged with the facings of the end portions and with the edges of all said facings disposed between said end portions and ends of said body portion, confining the outer faces of said end portions and compressing said end and body portions axially with sufficient pressure to substantially shorten said body portion, circumferentially confining said portions, subjecting the confined portions to internal pressure, and vulcanizing said portions to integrally unite said body portion with said end portions and form a rubber lined one-piece container.

8. The method of forming one-piece closed containers which comprises forming end and annular body portions of laminated, vulcanizable, fibrous material, supporting the body portion between said end portions, confining the outer faces of said end portions and compressing said end and body portions axially with sufficient pressure to shorten said body portion, circumferentially confining said portions, subjecting the confined container to internal pressure, and vulcanizing said container while so confined and under such pressure to integrally unite said end portions with said body portion.

9. The method of forming one-piece closed containers which comprises forming end and annular body portions of laminated, vulcanizable, fibrous material with the grains of adjacent sheets arranged at substantial angles to each other, supporting the body portion between said end portions, confining the outer faces of said end portions and compressing said end and body portions axially with sufficient pressure to shorten said body portion, circumferentially confining said portions, subjecting the confined container to internal pressure, and vulcanizing said container while so confined and under such pressure to integrally unite said end portions with said body portion.

10. The method of forming one-piece lined containers having end and annular body portions of vulcanizable material, one of said portions having a bung opening therein, which comprises facing said portions with rubber with the facing of the one portion covering the bung opening, mounting a valve member in said last mentioned facing to extend through the bung opening, supporting the body portion between said end portions, confining the outer faces of said end portions and compressing said end and body portions axially with sufficient pressure to substantially shorten said body portion, circumferentially confining said portions, inflating the container through said valve member to a substantial pressure, vulcanizing said portions to integrally join the same, and then cutting away the portion of the facing covering the bung opening.

11. The method of forming one-piece lined containers having head and body portions, one of said portions having a bung opening therein, which comprises facing said portions with rubber with the facing of the one portion bridging the bung opening, mounting a valve member in said last mentioned facing to extend through the bung opening, supporting the body portion between the end portions within a molding cavity, inserting a pressure medium into the container through said valve member, vulcanizing said portions, and then cutting away the portion of the facing covering the bung opening.

12. The method of forming one-piece containers having end and annular body portions of vulcanizable material, which comprises disposing said body portion between said end portions, subjecting said portions to axial pressure sufficient to shorten said body portion, and while said portions are so subjected, subjecting the same to internal heat and pressure to vulcanize and integrally unite said end and body portions.

13. The method of forming one-piece containers having end and annular body portions of vulcanizable material which comprises disposing said body portion between said end portions, axially compressing said portions to shorten said body portion, completely enclosing said container, and while creating internal pressure within the container subjecting the container to a vulcanizing temperature sufficient to integrally unite said body to said end portions.

HERMAN T. KRAFT.